C. A. ROGERS.
AUTOMOBILE TRAILER.
APPLICATION FILED DEC. 2, 1915.
1,228,138.
Patented May 29, 1917.
2 SHEETS—SHEET 1.
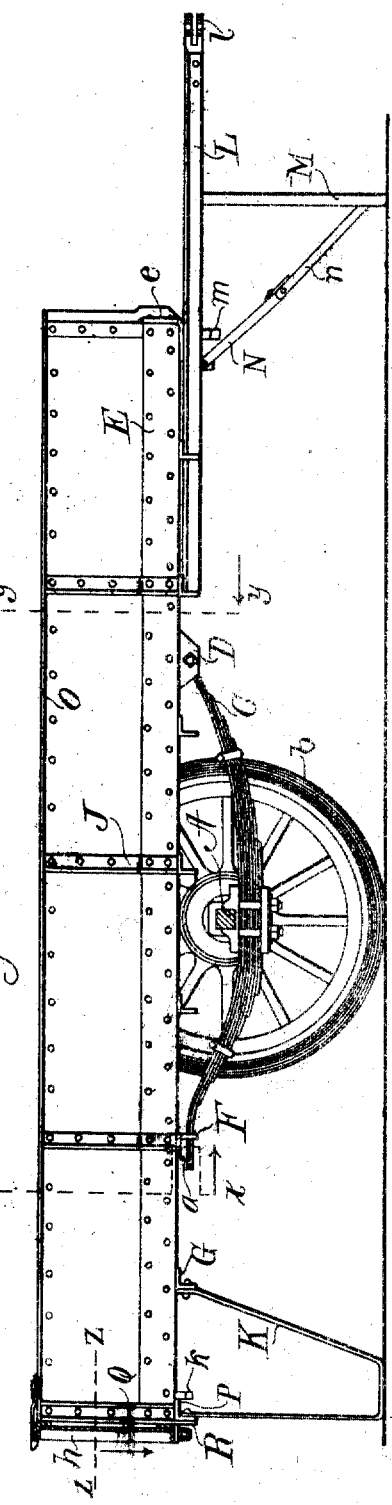
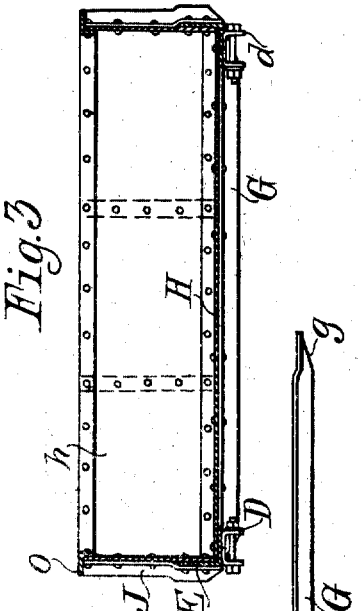
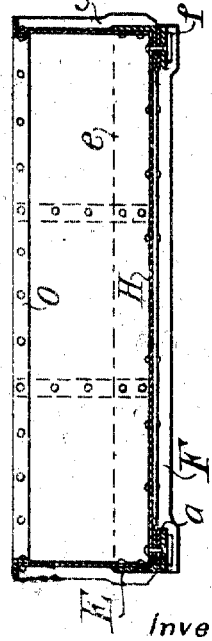
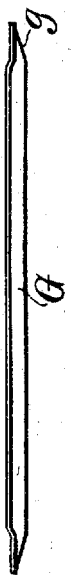
Inventor
Charles A. Rogers,
By Edwin Guthrie,
Attorney.

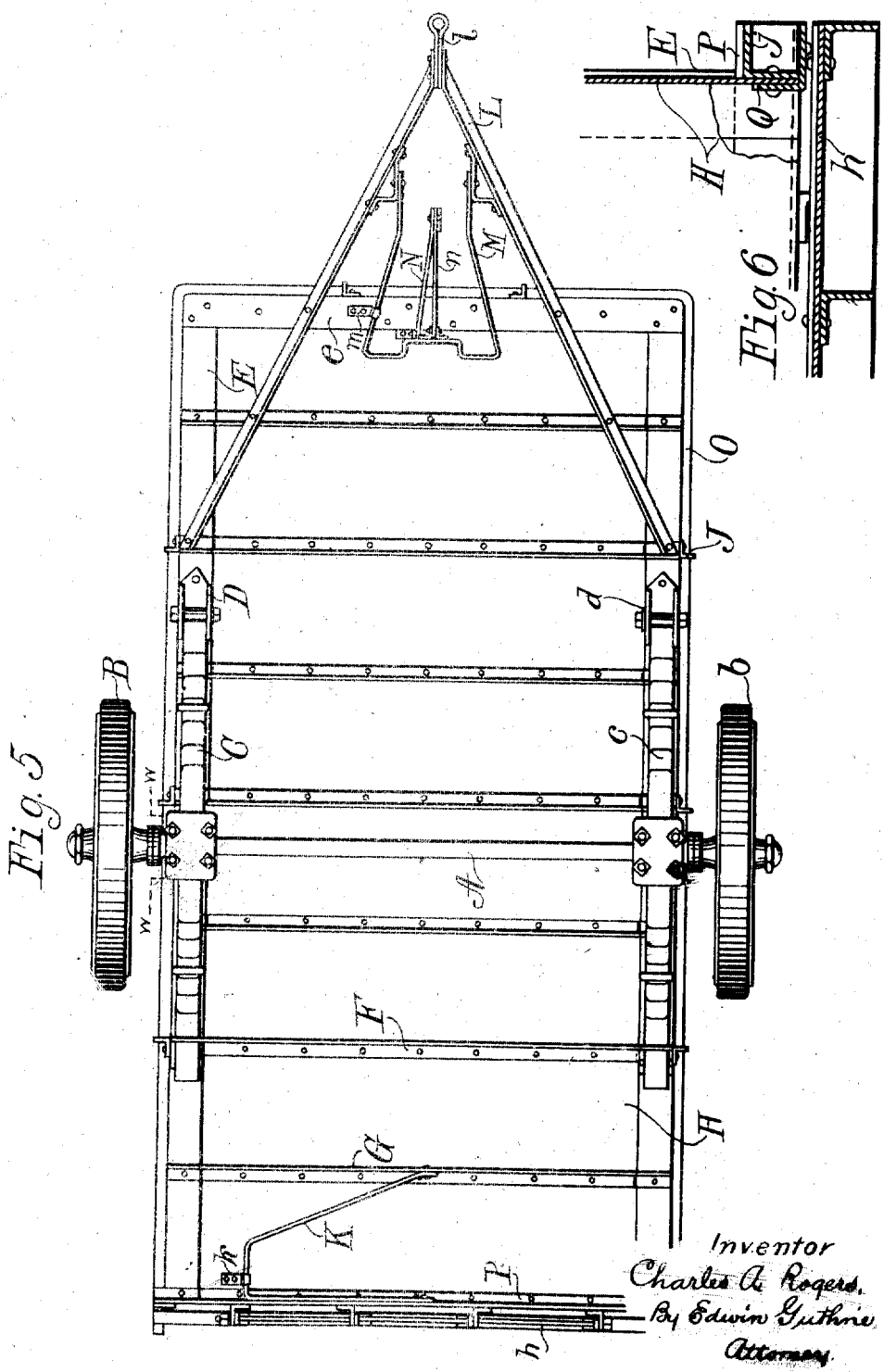

UNITED STATES PATENT OFFICE.

CHARLES A. ROGERS, OF ALBION, PENNSYLVANIA, ASSIGNOR TO ROGERS BROS. CO., OF ALBION, PENNSYLVANIA.

AUTOMOBILE-TRAILER.

1,228,138.   Specification of Letters Patent.   Patented May 29, 1917.

Application filed December 2, 1915. Serial No. 64,753.

*To all whom it may concern:*

Be it known that I, CHARLES A. ROGERS, a citizen of the United States, residing at Albion, in the county of Erie and State of Pennsylvania, have invented certain new and useful Improvements in Automobile-Trailers, of which the following is a specification.

This invention relates to automobile trailers, by which is meant in this case a two-wheeled vehicle having a tongue at the front provided with suitable means for connecting the trailer to the rear end of a motor vehicle, in order that a load in addition to that carried by the motor vehicle may be transported at the same time. Such trailers are now used by farmers, baggage carriers, contractors and builders, dairymen, and others.

The object of this invention is the production of a device of the character described, having parts of special construction and particular arrangement, all being formed of sheet metal usually steel, whereby it is believed an especially light, strong, easily manufactured and conveniently operated adjunct to motor vehicles results, enabling the motor to transport much more material in the same time than would otherwise be practicable.

The accompanying drawings set forth the construction and arrangement of parts comprising this invention, and Figure 1 represents a side view of all the parts assembled. In Fig. 1 the near wheel is not shown, and the axle is in section upon the indirect broken line w—w of Fig. 5. Fig. 2 is a cross-section of the body upon the broken line x—x of Fig. 1. Fig. 3 is a cross section of the body upon the broken line y—y of Fig. 1. Fig. 4 is a side view of one of the angle iron supporting bars. Fig. 5 is a plan view of all parts assembled, the view being taken from below to disclose various parts located on the under side or bottom of the body. Fig. 6 is a horizontal sectional view on the broken line z—z, showing the rear end corner construction.

Throughout the drawings and description the same letter is used to refer to the same part.

Considering the drawings, an axle A is provided with wheels B and b, and in practice the wheels are equipped with rubber tires and roller or ball bearings of any chosen form and with which this invention is not concerned. The axle is secured to the vehicle springs C and c, and the forward ends of the springs are pivotally secured in clips or holders D and d, best shown in Fig. 5.

An under frame consisting of angle irons E and e, is secured to the bottom and sides of the body of the vehicle.

As best illustrated in Figs. 2 and 5, one of the angle iron cross-bars F which extend from side to side of the frame, is provided near its ends with the slots f, to be again mentioned. The other spaced angle iron supporting bars extending transversely beneath the body are designated by the letter G, and each bar has its ends g cut away in an inclined direction as shown in Fig. 4. Each of the transverse supporting bars is riveted at intervals to the bottom of the body H, and to the sides of the frame. The body comprises the bottom and front end and sides as illustrated, and the sides are strengthened by the spaced vertical angle iron braces J, each of which has an off-set lower end as shown in Figs. 2 and 3. The upper portion of each vertical brace is secured to the side of the body, and the off-set lower portion of each brace is similarly secured to the vertical leg of the angle iron frame, the rivets extending through the side of the body also. It will be noted that the frame angle irons E, e, are relatively wider than the other angle irons, and that both legs of the angle iron braces J are off-set outwardly to embrace the vertical legs of the frame angle irons.

When it is desired that this invention shall stand alone as illustrated in Fig. 1, it is necessary to support the body in a horizontal position, and this is found to be most satisfactorily accomplished by arranging the U-shaped frame K at the rear and upon the under side of the body pivotally connected with the two rearmost transverse supporting bars, and adapted to be let down by hand into the vertical supporting position shown in Fig. 1, or raised out of the way under the body and releasably secured by the catch $k$, as shown in Fig. 5. At the front end of the body the V-shaped tongue L projects, and it is provided with a slotted terminal eye $l$ by which coupling may be made with an automobile. To support the front end of this invention when standing by itself, there is provided a U-shaped leg M, pivotally attached to the tongue L, and suitably braced by the inclined pieces N and $n$ that are pivotally connected together. To hold the leg M in its raised position a catch $m$ is arranged beneath the body as shown in Figs. 1 and 5.

In order that the upper edges of the sides and end of the body H may be adequately reinforced or stiffened, there is secured to those parts along their upper edges an angle iron cap strip O, and it will be noted in Figs. 1, 2, and 3, that the vertical, spaced angle iron braces J terminate below and against the cap strip which they thus support at intervals.

Considering Figs. 1 and 6, attention is requested to the rear end corner construction illustrated. It is found imperatively necessary that the rear end corners of the body H, against which the pivoted tail gate is repeatedly closed with more or less violence, shall be of especially strong design and construction. The desired strength is attained by constructing the rear member P of the angle iron under frame somewhat longer than the width of the body, in order that its ends may project beyond the sides of the body. Two angle iron braces are employed. The leg of one brace lies as shown against the outside of the side of the body H, and the leg of the other brace is arranged against the inside of the side of the body. The outside brace is marked $j$ and the brace having the leg inside is designated Q. It will be observed that on the outside beyond the side of the body, the legs of both those braces are parallel with each other. The brace $j$ terminates upon the projecting end of the rear member P of the angle iron under frame, but the leg R of the other brace Q is extended downwardly and riveted to the depending leg of the member P. The construction set forth affords an exceedingly stout and rigid corner or end for the rear portion of the body, and successfully withstands the repeated slamming shut of the tail gate $k$.

It has been explained herein that one of the transverse supporting bars F has the slots $f$ near its ends, and that the ends of the springs C and $c$ pass through those slots. A considerable portion of the weight of the body H and its load must be carried by the rear ends of the springs, and the curve of the springs is obviously flatter when the body is loaded than when unloaded, and the curvature is constantly changing by reason of the inequalities of the roadway during the progress of this invention when drawn along by a motor vehicle. Therefore, the ends of the springs slip back and forth almost all the time, and some support other than the relatively thin edge of the slots $f$ must be introduced. Bearing blocks $a$ are located adjacent to the slots $f$ in such position that the ends of the springs are in movable contact with the blocks. The blocks take the wear and transmit the weight of the load to the rear ends of the springs, while allowing ample play lengthwise for the springs.

The operation of this invention consists in securing the tongue L to a suitable motor whereby it may be drawn along, and the objects of the invention are believed to be made clear from the foregoing explanation, which sets forth the specially constructed sheet steel body, strengthened by the angle iron under frame members E and $e$, the vertical spaced angle iron braces, supporting at intervals the cap piece O, and the transverse angle iron supporting bars F and G, all secured to the bottom and sides of the body. Advantageous features of this invention are also the particular rear end corner construction, and the slotted supporting bar F and bearing blocks $a$ as set forth.

Having now described and explained the objects and construction of this invention, what I claim is:—

1. In a vehicle body, the combination with an angle iron frame, of a bottom supported by the said angle iron frame, one leg of each angle iron of the frame passing beneath the edge of the bottom, the said body having sides and front extending upwardly from the bottom, the other leg of each angle iron of the frame being arranged on the outside of the said sides and front, the said sides and front having vertical spaced angle iron braces secured thereto and the said bottom having spaced angle iron supporting bars secured thereto, both legs of the said vertical angle iron braces and the said angle iron bars near their ends being off-set to engage the said exteriorly disposed legs of the angle irons of the said frame, and the said set-off ends of the angle iron braces and bars being secured to the angle iron frame.

2. In a device of the character described, a rear end corner construction comprising in combination with a body having sides and bottom, an angle iron frame secured to the side and bottom of the said body, the ends of the rear member of the said frame projecting laterally beyond the sides of the body, and said member having a downwardly extending leg, vertical angle iron braces having legs arranged upon the outside and inside of the side of the said body and secured thereto and to each other, the remaining legs of the said vertical braces having a space between them, the said vertical brace attached upon the outside of the side of the body terminating upon the said projecting portion of the said rear member of the frame, and the said vertical brace attached upon the inside of the side of the body having one leg extended downwardly and secured to the said downwardly extending leg of the said rear member of the frame.

In testimony whereof I affix my signature.

CHARLES A. ROGERS.